(12) United States Patent
Heath et al.

(10) Patent No.: US 8,581,438 B2
(45) Date of Patent: Nov. 12, 2013

(54) PROVIDING POWER TO POWERED DEVICE HAVING MULTIPLE POWER SUPPLY INPUTS

(75) Inventors: Jeffrey Lynn Heath, Santa Barbara, CA (US); John Arthur Stineman, Carpinteria, CA (US); Ryan Charles Huff, Santa Barbara, CA (US); Kirk Tzukai Su, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 416 days.

(21) Appl. No.: 12/759,270

(22) Filed: Apr. 13, 2010

(65) Prior Publication Data

US 2011/0125341 A1 May 26, 2011

Related U.S. Application Data

(60) Provisional application No. 61/263,628, filed on Nov. 23, 2009.

(51) Int. Cl.
*H02J 1/10* (2006.01)

(52) U.S. Cl.
USPC ..................................... 307/43; 307/1; 307/2

(58) Field of Classification Search
USPC ............... 307/2, 43, 64, 1; 700/295
See application file for complete search history.

(56) References Cited

U.S. PATENT DOCUMENTS

| | | | |
|---|---|---|---|
| 2006/0080573 A1 | 4/2006 | Biederman et al. | |
| 2006/0242458 A1 * | 10/2006 | Feldman et al. | 714/14 |
| 2008/0168283 A1 * | 7/2008 | Penning | 713/310 |
| 2009/0073957 A1 | 3/2009 | Newland et al. | |
| 2009/0278408 A1 | 11/2009 | Cioffi | |
| 2011/0096522 A1 * | 4/2011 | Humphrey et al. | 361/807 |

FOREIGN PATENT DOCUMENTS

| | | |
|---|---|---|
| EP | 1 942 600 A1 | 7/2008 |
| WO | WO 2005/071885 A1 | 8/2005 |

OTHER PUBLICATIONS

IEEE Computer Society: "IEEE Std 802.3at-2009: IEEE Standard for Information Technology—Telecommunications and information exchange between systems—Local and metropolitan area networks—Specific requirements", Oct. 30, 2009, The Institute of Electrical and Electronics Engineers, Inc., XP002646858, ISBN: 978-0-7381-6042-9, pp. 1-5, IV-XVI, 1-123.

International Search Report and the Written Opinion of the International Searching Authority, issued in International Application No. PCT/US2010/057413, dated Jul. 20, 2011.

* cited by examiner

*Primary Examiner* — Carlos Amaya
(74) *Attorney, Agent, or Firm* — McDermott Will & Emery LLP

(57) ABSTRACT

A system for providing power to a load, having first and second power supply inputs respectively responsive to first and second input signals from first and second power supply sources to supply power to the load. For example, the first power supply input may be configured for supplying the load with power received from a communication link, such as an Ethernet link, and the second power supply input may be configured for supplying the load with power from an auxiliary power source. A power converter is provided to produce an output signal for supplying power to the load in response to the second input signal. The power converter is controlled to produce the output signal in accordance with a value of the first input signal.

29 Claims, 3 Drawing Sheets

PROVIDING POWER TO POWERED DEVICE HAVING MULTIPLE POWER SUPPLY INPUTS

This application claims priority of and incorporates by reference provisional U.S. patent application No. 61/263,628 filed on Nov. 23, 2009, and entitled "POWERED DEVICE PROVIDING SEAMLESS SWITCHING BETWEEN POWER SUPPLY INPUTS."

TECHNICAL FIELD

This disclosure relates to power supply systems, and more particularly, to providing power to a powered device having multiple power supply inputs, such as a Powered Device (PD) in a Power over Ethernet (PoE) system or a Power over Ethernet Plus (PoE+) system, capable of receiving power from the Ethernet and from auxiliary power supplies.

BACKGROUND ART

Over the years, the Ethernet has become the most commonly used method for local area networking. PoE and PoE+ systems provide power delivery over unshielded twisted-pair wiring from Power Sourcing Equipment (PSE) to a PD located at opposite sides of the Ethernet link. Powered Devices (PDs) may include such network devices as IP phones, wireless LAN access points, personal computers, Web and security cameras, etc. The PoE/PoE+ system supports providing power to PDs over Ethernet cabling used for data transmission.

The PoE system is defined in the IEEE 802.3af standard, and the PoE+ system is described in the IEEE 802.3at draft standard. PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device.

PSE searches the link for a PD requesting power, optionally classifies the PD, supplies power to the link if a PD is detected, monitors the power on the link, and disconnects power when it is no longer requested or required. PD participates in the PD detection procedure by presenting a PoE detection signature defined in the IEEE 802.3af standard and/or the IEEE 802.3at standard (referred to below as "IEEE 802.3af/IEEE 802.3at standard"). If the detection signature is valid, the PD has an option of presenting to the PSE a class signature defined in the IEEE 802.3af/IEEE 802.3at standard, to indicate how much power it will draw when powered up. Based on the determined class of the PD, the PSE applies the required power to the PD.

In addition to a PoE/PoE+ power supply input coupled to an Ethernet link, the PD may have one or more auxiliary power supply inputs for receiving power from auxiliary power supply sources to support operation of the PD when the power from the PSE is not available.

Therefore, it would be desirable to develop efficient and cost-effective circuitry that would enable a PD to receive power from the PoE/PoE+ power supply input and from the auxiliary power supply inputs, and provide seamless switching among various power supply inputs.

SUMMARY OF THE DISCLOSURE

In accordance with one aspect of the disclosure, a system for providing power to a load comprises first and second power supply inputs respectively responsive to first and second input signals from first and second power supply sources to supply power to the load. For example, the first power supply input may be configured for supplying the load with power received from a communication link, such as an Ethernet link, and the second power supply input may be configured for supplying the load with power from an auxiliary power source. A power converter is provided to produce an output signal for supplying power to the load in response to the second input signal. The power converter is controlled to produce the output signal in accordance with a value of the first input signal.

In particular, the power converter may be controlled to produce the output signal so as to make a difference between a value of the output signal and the value of the first input signal smaller than a difference between a value of the second input signal and the value of the first input signal.

The system may comprise a priority mechanism for enabling a user to select between supplying the load from the first power supply input or from the second power supply input when both power supply inputs are provided with power values sufficient to power the load.

The priority mechanism may include a converter control circuit responsive to a priority select signal for producing a converter control signal that controls the power converter so as to power the load from the selected power supply input when both power supply inputs are provided with power values sufficient to power the load.

In response to the converter control signal, the power converter may produce the output signal at a level selected to enable the selected power supply input to provide power to the load and to prevent a non-selected power supply input from supplying power to the load.

For example, in response to the converter control signal, the power converter may produce the output signal having a value lower than a value of the first power supply signal if the first power supply input is selected to power the load, and to produce the output signal having a value higher than the value of the first power supply signal if the second power supply input is selected to power the load.

The priority mechanism may be configured to enable the user to change a priority of one power supply input over another power supply input when both power supply inputs are provided with power values sufficient to power the load.

A power supply sensing mechanism may be provided for sensing the second input signal at the second power supply input so as to enable the power converter to operate as a DC/DC converter when the second input signal is a DC signal and to operate as an AC/DC converter when the second input signal is an AC signal.

In accordance with another aspect of the disclosure, a system for providing power to a powered device comprises a communication link power supply path responsive to a first power supply signal received from a communication link, for powering the powered device, and an auxiliary power supply path responsive to a second power supply signal from an auxiliary power source, for powering the powered device. For example, the communication link power supply path may be configured to supply the powered device with power received from an Ethernet link in accordance with Power over Ethernet (PoE) requirements. The power converter may have an input responsive to a power supply signal from the auxiliary power source, and an output to produce a converter output signal for providing power from the auxiliary power source to the powered device.

A control circuit is provided to control the power converter so as to provide power supply switching between the communication link power supply path and the auxiliary power supply path. In particular, the control circuit may control the power converter so as to initiate supplying the powered device from the communication link power supply path when the powered device is provided with power from the auxiliary power supply path, and to initiate supplying the powered device from the auxiliary power supply path when the powered device is provided with power from the communication link power supply path.

The control circuit may be configured to provide power supply switching between the communication link power supply path and the auxiliary power supply path without disrupting power supply of the powered device.

The power converter may be controlled to produce the converter output signal at a first level that enables the communication link power supply path to power the powered device, and to produce the converter output signal at a second level that enables the auxiliary power supply path to power the powered device.

In particular, the power converter may be controlled to produce an output voltage value lower that a voltage value from the communication link power supply path in order to enable the communication link power supply path to power the powered device, and to produce the output voltage value greater that the voltage value from the communication link power supply path in order to enable the auxiliary power supply path to power the powered device In accordance with an exemplary embodiment of the disclosure, the power converter may be controlled to produce the converter output signal at a level selected to electrically isolate the communication link power supply path from the auxiliary power supply path.

Also, the power converter may be controlled to produce the converter output signal at a level selected to enable the communication link power supply path to receive power from the communication link when the auxiliary power supply path provides powering of the powered device.

In particular, the communication link power supply path may be configured for producing a detection signature required to detect the powered device, when the auxiliary power supply path provides powering of the powered device. The power converter may be controlled to produce the converter output signal at a level selected to prevent the detection signature from being corrupted by the auxiliary power supply path.

Also, the communication link power supply path may be configured for drawing the minimum amount of current required to maintain power supply from the communication link, when the auxiliary power supply path provides powering of the powered device.

The control circuit may be configured to enable a user to select between powering the powered device from the communication link or from the auxiliary power source when sufficient power from both the communication link power supply path and the auxiliary power supply path is available for powering the powered device. The control circuit may control the power converter so as to power the powered device in accordance with user's selection.

A diode bridge may be provided at an input of the auxiliary power supply path to receive a power supply signal from the auxiliary power source. Alternatively, a transistor bridge including first and second pairs of transistors may be provided at the input of the auxiliary power supply path to receive the power supply signal.

A polarity detector may be provided to sense polarities of the signals at the input and output of the transistor bridge so as to set the first pair of transistors in an on state and the second pair of transistors in an off state when a polarity of a signal at an input of the transistor bridge coincides with a polarity of a signal at an output of the transistor bridge, and to set the second pair of transistors in an on state and the first pair of transistors in an off state when a polarity of the signal at the input of the transistor bridge does not coincide with a polarity of the signal at the output of the transistor bridge.

The system may further include first and second output diode components, wherein the first output diode component may be controlled to enable the communication link power supply path to power the powered device and prevent the auxiliary power supply path from powering the powered device, and the second output diode component may be controlled to enable the auxiliary power supply path to power the powered device and prevent the communication link power supply path from powering the powered device.

Alternatively, first and second output transistor components may be provided, wherein the first output transistor component may be controlled to enable the communication link power supply path to power the powered device and prevent the auxiliary power supply path from powering the powered device, and the second output transistor component may be controlled to enable the auxiliary power supply path to power the powered device and prevent the communication link power supply path from powering the powered device.

The control circuit may be configured to control the power converter in accordance with a difference between an output voltage of the power converter and a voltage at a node between the first output transistor component and the second output transistor component.

In accordance with a further aspect of the disclosure, the power converter may be configured to perform power factor correction.

In accordance with an embodiment of the disclosure, the communication link power supply path may be configured to receive PoE+ power from the Ethernet link provided in accordance with IEEE 802.3at standard. In particular, the communication link power supply path may be configured to detect the PoE+ power based on 2-Event Physical Layer classification. Alternatively, the communication link power supply path may detect the PoE+ power based on Data Link Layer classification.

In accordance with a method of the present disclosure, the following steps may be carried out to provide power to a powered device from first and second power supply inputs:
    converting a first power supply signal from a first power supply input to produce an output signal having a first value selected to power the powered device from the first power supply input and to prevent the second power supply input from powering the powered device, and
    converting the first power supply signal from the first power supply input to produce the output signal having a second value selected to power the powered device from the second power supply input and to prevent the first power supply input from powering the powered device.

A value of the output signal may be controlled in accordance with a value of a second power supply signal from the second power supply input so as to reduce a difference between the value of the output signal and a value of the second power supply signal with respect to a difference between a value of the first power supply signal and the value of the second power supply signal.

The output signal may be controlled so as to switch power supply of the powered device between the first power supply input and the second power supply input without disrupting power supplied to the powered device.

Also, the output signal may be controlled so as to select either the first power supply input or the second power supply input for powering the powered device when both the first power supply input and the second power supply input are available to provide sufficient power to power the powered device.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The drawing figures depict concepts by way of example, not by way of limitations. In the figures, like reference numerals refer to the same or similar elements.

DETAILED DISCLOSURE OF THE EMBODIMENTS

The present disclosure will be made with examples of a powered device (PD) in a PoE and/or PoE+ (referred to below as PoE/PoE+) environment. It will become apparent, however, that the concepts described herein are applicable to providing power to any powered device using multiple power supply inputs.

Figure 1:
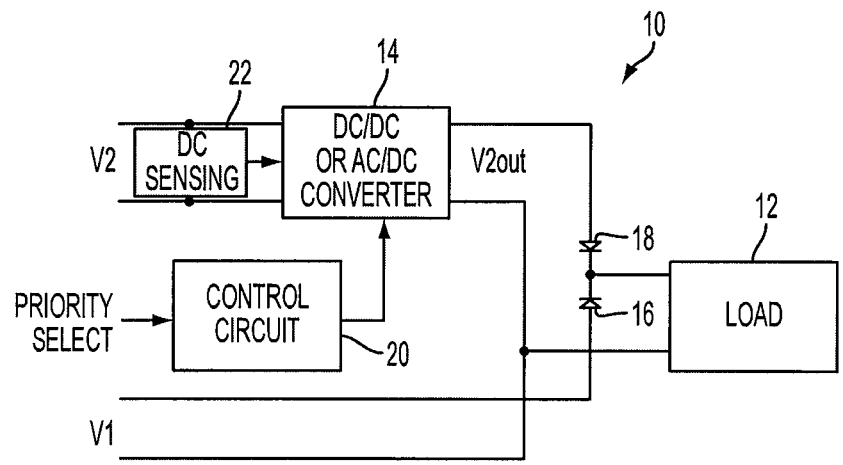
FIG. 1 is a diagram illustrating a general concept of a system for providing power to a load using multiple power supply inputs in accordance with the present disclosure.

FIG. 1 illustrates a general concept of a system 10 that provides power to a load 12 and has a pair of power supply inputs for supplying input voltages V1 and V2. For example, input voltages V1 and V2 may be DC voltages. However, as discussed in more detail below, one of input voltages, for example, voltage V2 may be AC voltage.

The voltage V1 is supplied to the load via a first power supply channel, whereas the voltage V2 is supplied to the load via a second power supply channel having a power converter 14, such as DC/DC or AC/DC converter, that may convert the voltage V2 so as to provide balancing between the voltage supplied to the load 12 from the first power supply channel and the voltage supplied to the load 12 from the second power supply channel. The power converter 14 may be controlled in accordance with the voltage value V1 so as to convert the voltage value V2 into a desired output voltage value V2out. For example, the power converter 14 may be controlled to reduce a difference between V1 and V2out with respect to a difference between V1 and V2. Hence, the power converter 14 reduces the design burden on the load circuitry 12 by decreasing the voltage range in which the load 12 must operate. Voltages V1 and V2out may be respectively supplied to the load 12 via unidirectional conduction devices, such as diodes 16 and 18.

In accordance with one aspect of the disclosure, a priority mechanism may be provided to enable the user to select which power supply channel should provide power to the load 12 when both voltages V1 and V2 are sufficient to power the load 12. The priority mechanism may include a control circuit 20 supplied with a priority select signal to produce a converter control signal that controls the power converter 14. The priority select signal may be defined by the user to set a priority of one power supply channel over the other power supply channel.

For example, if the priority select signal is asserted to establish priority of the first power supply channel over the second power supply channel, the control circuit 20 may adjust the power converter 14 so as to produce the voltage value V2out at the output of the converter 14 lower than the voltage V1. As a result, the output voltage of the first power supply channel will be provided to the load 12, and the output voltage of the second power supply channel will be prevented by the diode 18 from being supplied to the load 12.

By contrast, if the priority select signal is asserted to establish priority of the second power supply channel over the first power supply channel, the control circuit 20 may adjust the power converter 14 so as to produce the voltage value V2out at the output of the converter 14 higher than the voltage V1. As a result, the output voltage of the second power supply channel will be provided to the load 12, and the output voltage of the first power supply channel will be prevented by the diode 16 from being supplied to the load 12.

The priority mechanism of the present disclosure provides seamless switching between the power supply inputs V1 and V2 without disrupting the voltage being supplied to the load 12. The priority can be set and dynamically changed by asserting the priority select signal in accordance with the user's requirements. For example, the priority select signal may be asserted at a first logic level to provide priority of the first power supply channel over the second power supply channel, and the priority select signal may be asserted at a second logic level to provide priority of the second power supply channel over the first power supply channel. As one skilled in the art would realize, the priority mechanism of the present disclosure can be utilized to establish priority of any one power supply channel or any group of power supply channels over another power supply channel or another group of power supply channels.

The second power supply channel may operate with either DC voltage or AC voltage provided at its input. A DC sensing circuit 22 may be arranged at the input of the second power supply channel to determine whether AC voltage or DC voltage is provided. If the DC voltage is sensed at the input of the second power supply channel, the DC sensing circuit 22 controls the power converter 14 to operate in a DC-to-DC voltage conversion mode. If no DC voltage is sensed, the DC sensing circuit 22 controls the power converter 14 to operate in an AC-to-DC voltage conversion mode.

Figure 2:
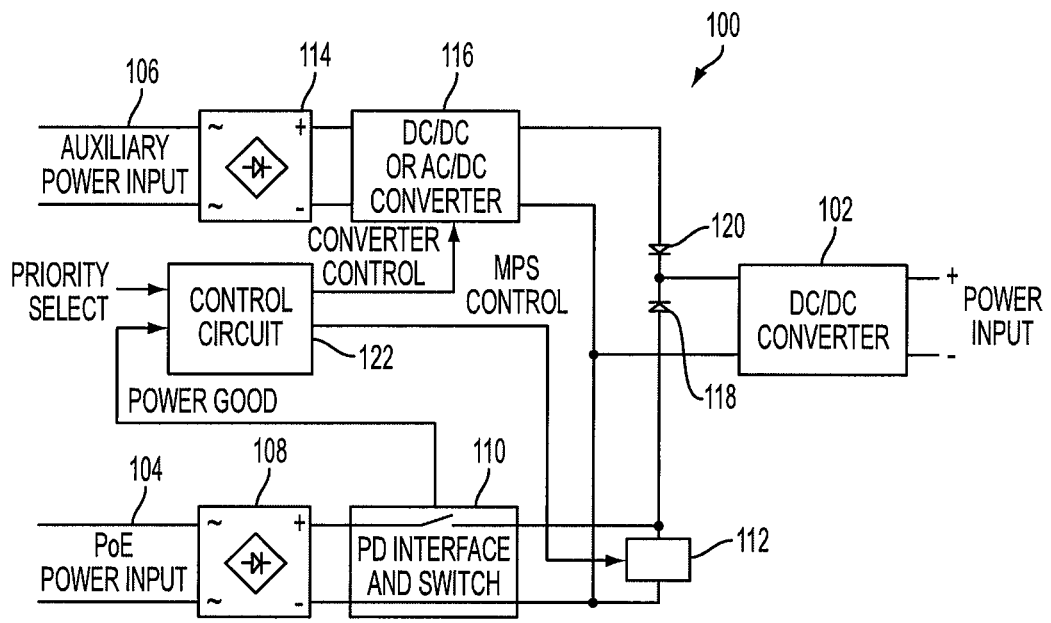
FIG. 2 is a diagram illustrating an exemplary embodiment of a system for supplying power to a powered device using PoE/PoE+ power supply input coupled to an Ethernet link and at least one auxiliary power supply input for providing power from an auxiliary power source.

FIG. 2 illustrates an exemplary system 100 for providing power to a powered device (PD) in a PoE/PoE+ environment. The system 100 provides power to a power converter 102, such as a DC/DC converter, that generates a power output required by the PD, which is connectable to the power converter 102. The system 100 includes a PoE/PoE+ power supply channel 104 for providing PoE/PoE+ power supply input from the Ethernet cabling in accordance with PoE or PoE+ requirements respectively described in the IEEE 802.3af standard or the IEEE 802.3at draft standard. An eight-wire Ethernet connector, such as a Registered Jack-45 (RJ-45) connector, may be used for providing electrical connection to the Ethernet cabling. As described in the IEEE 802.3af/IEEE 802.3at standard, the Ethernet connector may be connected to data communication circuitry that may include magnetic components and associated circuitry required for supporting Ethernet data communications protocols, such as 10BASE-T, 100BASE-T, 100BASE-TX and/or 1000BASE-T, performed to provide data communication over the Ethernet network. Also, the system may include an auxiliary power supply channel 106 for providing power from an auxiliary AC or DC power source such as a wall transformer.

The PoE/PoE+ power supply channel 104 may include an input diode bridge circuit 108 that may be connected to the magnetic components of the Ethernet data communication circuitry to enable the PD to accept voltages of any polarity when power is supplied over the Ethernet link. Further, the PoE/PoE+ power supply channel 104 includes PD interfacing and switching circuitry 110 that performs operations prescribed by the IEEE 802.3af/IEEE 802.3at standard in order to deliver power from the respective Power Sourcing Equipment (PSE) to the PD.

In particular, when the PSE performs a detection procedure to detect whether the PD is a valid PD that may be provided with PoE/PoE+ power, the interfacing and switching circuitry 110 presents a valid detection signature required from the PD. For example, the detection signature may be a 25K signature resistor. When the PSE applies a proper detection voltage on the Ethernet cabling, the interfacing and switching circuitry 110 may connect the signature resistance to the PoE/PoE+ input so as to enable the PSE to detect it.

After presenting the valid detection signature, the PD has an option of presenting a class signature to the PSE to indicate how much power it will draw when powered up. For example, a PD may be classified as class 0 to class 4. Based on the determined class of the PD, the PSE applies the required power to the PD over the Ethernet link. The interfacing and switching circuitry 110 supports the PD operation by presenting a class signature that indicates a power requirement of the PD. For example, the class signature may be presented in a form of classification current asserted by the interfacing and switching circuitry 110 in response to a prescribed value of classification voltage applied by the PSE.

When the PoE/PoE+ power is provided in accordance with the IEEE 802.3af/IEEE 802.3at procedure, the interfacing and switching circuit 110 may produce a power good signal indicating that the PoE/PoE+ power supply is available and ready. Also, when the power up procedure prescribed by the IEEE 802.3af/IEEE 802.3at is completed, a switch in the interfacing and switching circuit 110 may be set into an on state to supply the PoE/PoE+ power to the converter 102.

In accordance with the IEEE 802.3af/IEEE 802.3at standard, the PSE uses the maintain power signature (MPS) operation to determine if a PD continues to require power after the power was provided to the PD. The MPS requires the PD to periodically draw at least 10 mA. The PoE/PoE+ power supply channel 104 may include a minimum load current circuit 112 that provides the load current required to satisfy the MPS requirement. The minimum load current circuit 112 may include an MPS current source for providing the load current required to satisfy the MPS requirements, and an MPS control switch controlled by an MPS control signal to enable the current supply from the MPS current source at a time period when the MPS is required in accordance with the IEEE 802.3af/IEEE 802.3at standard. To reduce the average power dissipation, the MPS control signal may be a periodic signal that turns the MPS control switch on and off periodically.

The auxiliary power supply channel 106 may include an input diode bridge circuit 114 connected to the auxiliary power source so as to accept voltages of any polarity when power is supplied from the auxiliary power source. As discussed below, the input diode bridge circuit may be replaced with a MOSFET bridge circuit to reduce power loss on the input bridge circuit.

Further, the auxiliary power supply channel 106 may include a power converter 116, such as a DC/DC or AC/DC converter, for converting the input voltage applied from the auxiliary power supply source so as to provide balancing between the voltage supplied to the power converter 102 from the PoE/PoE+ power supply channel 104 and the voltage supplied to the power converter 102 from the auxiliary power supply channel 106. For example, the power converter 116 may convert the voltage from the auxiliary power supply into a value that is closer to the voltage supplied from the Ethernet link, in order to reduce the difference between these voltages. Voltage from the PoE/PoE+ power supply channel 104 and the output voltage of the power converter 116 may be respectively supplied to the DC/DC converter 102 via unidirectional conduction devices, such as diodes 118 and 120.

In a purely resistive AC circuit, voltage and current waveforms are in step (or in phase), changing polarity at the same instant in each cycle. If reactive loads are present, energy storage in the loads result in a time difference between the current and voltage waveforms. Circuits containing purely resistive elements have a power factor of 1.0. Circuits containing inductive or capacitive elements often have a power factor below 1.0. A circuit with a lower power factor will use higher currents to transfer a given quantity of real power than a circuit with a higher power factor.

Therefore, the AC/DC power converter 116 may be configured to perform power factor correction, i.e. to adjust the power factor of the circuit to near 1.0, to reduce the reactive power loss. In particular, the power converter 116 performs power factor correction by aligning the load current of the power converter 116 in phase with the AC voltage so that the auxiliary power input 106 appears purely resistive and the reactive power loss is reduced.

The system 100 further includes a control circuit 122 that controls the power converter 116 and the minimum load current circuit 112 to provide seamless switching between the PoE/PoE power supply input and the auxiliary power supply input.

In particular, the control circuit 122 may support a priority mechanism provided to enable the user to select whether the PoE/PoE+ power supply or the auxiliary power supply should provide power to the PD when both the PoE/PoE+ voltage and the auxiliary power source voltage are sufficient to power the PD. The control circuit 122 is supplied with a priority select signal to produce a converter control signal that controls the power converter 116. The priority select signal may be defined by the user to set a priority of one power supply channel over the other power supply channel.

For example, if the priority select signal is asserted to establish priority of the PoE/PoE+ power supply over the auxiliary power supply, the control circuit 122 may adjust the power converter 116 so as to produce the voltage value at the output of the converter 116 lower than the PoE/PoE+ voltage from the Ethernet link. As a result, the PoE/PoE+ voltage will be provided to the PD, and the voltage of the auxiliary power supply channel will be prevented by the diode 120 from being supplied to the PD.

By contrast, if the priority select signal is asserted to establish priority of the auxiliary power supply over the PoE/PoE+ power supply, the control circuit 122 may adjust the power converter 116 so as to produce the voltage value at the output of the converter 116 higher than the PoE/PoE+ voltage. As a result, the output voltage of the auxiliary power supply channel will be provided to the PD, and the PoE/PoE+ voltage will be prevented by the diode 118 from being supplied to the PD.

In conventional PD power supply systems having a PoE power supply input and an auxiliary power supply input, when a PD is supplied from an auxiliary power source, PoE power supply from the Ethernet link is disrupted because the PD no longer draws current from the Ethernet, and a PSE removes power since the MPS requirement is not satisfied.

Moreover, in conventional PD power supply systems, when a PD is supplied from an auxiliary power source, the PSE cannot perform the detection procedure prescribed by the PoE/PoE+ standard because the PD input impedance that serves as the detection signature resistance becomes corrupted since the input diode bridge 108 is reverse biased by the auxiliary voltage, which is higher than the PoE voltage. Therefore, when the auxiliary power supply provided from the auxiliary power source is removed, the PD must go through the detection, classification and power-up procedures prescribed by the PoE/PoE+ standard, in order to resume PoE/PoE+ power supply from the Ethernet link. As a result, switching from the auxiliary power supply to the PoE/PoE+ power supply cannot be performed without disrupting power at the PD.

In accordance with the present disclosure, the power converter 116, together with the diode 118, prevents the detection signature resistance from being corrupted. In particular, when the power converter 116 produces the output voltage that is higher than the PoE/PoE+ voltage, the PoE/PoE+ power supply channel is isolated by the reverse diode 118, which prevents any current from being added to or subtracted from the PoE/PoE+ power supply channel to corrupt the detection signature. Hence, even when the PoE/PoE+ power supply to the PD is replaced with the auxiliary power supply, the PSE is enabled to detect a detection signature presented by the PoE/PoE+ power supply channel in response to a detection signal from the PSE.

Moreover, in accordance with the present disclosure, the minimum load current circuit 112 enables the PD to maintain the necessary load current required to satisfy the MPS requirement even when the PD is powered with the auxiliary power supply instead of the PoE/PoE+ power supply. The control circuit 122 is configured to produce the MPS control signal supplied to the minimum load current circuit 112 to dynamically enable or disable the MPS current supply from the minimum load current circuit 112.

When the auxiliary power supply channel 106 is selected to provide power to the PD, the MPS is required to prevent the PoE/PoE+ power supply at the input of the PoE/PoE power supply channel 104 from being disrupted, and to enable the PoE/PoE+ power supply input to replace the auxiliary power supply input, if necessary. Hence, the control circuit 122 enables the current supply from the MPS current source in the minimum load current circuit 112 when the auxiliary power supply channel 106 powers the PD and the PoE/PoE+ power supply channel 104 operates in a standby mode capable of replacing the auxiliary power supply, if necessary.

The MPS supply from the MPS current source is disabled during the PoE/PoE+ powering procedure performed to establish the PoE/PoE+ power supply at the input of the PoE/PoE+ power supply channel 104. Also, when the auxiliary power supply is not present or if the auxiliary power supply is not selected by the priority select signal, the MPS supply from the minimum load current circuit 112 may be disabled to improve power delivery efficiency from the PoE/PoE+ power supply input.

Hence, when both the auxiliary power supply and the PoE/PoE+ power supply are provided at the respective power supply inputs, the control circuit 122 responds to the priority select signal by supplying the power converter 116 with the converter control signal to set the output voltage of the converter 116 above or below the voltage applied at the input of the PoE/PoE+ power supply channel 104. If the priority is selected to establish the auxiliary power supply of the PD, the power converter 116 is controlled to maintain its output voltage above the PoE/PoE+ voltage.

When the priority is selected to set the PoE/PoE+ power supply of the PD, the control circuit 122 determines whether the power good signal is provided from the interfacing and switching circuit 110. If the power good signal is detected, the control circuit 122 controls the power converter 116 to provide the output voltage at a level below the PoE/PoE+ voltage so as to enable the PoE/PoE+ channel 104 to supply power to the converter 102 and the PD.

As discussed above, switching between the PoE/PoE+ power supply input and the auxiliary power supply input is provided seamlessly without disruption of the voltage being supplied to the PD. Also, the selected priority of one power supply channel over another power supply channel may be changed dynamically by adjusting the voltage at the output of the converter 116.

Figure 3:
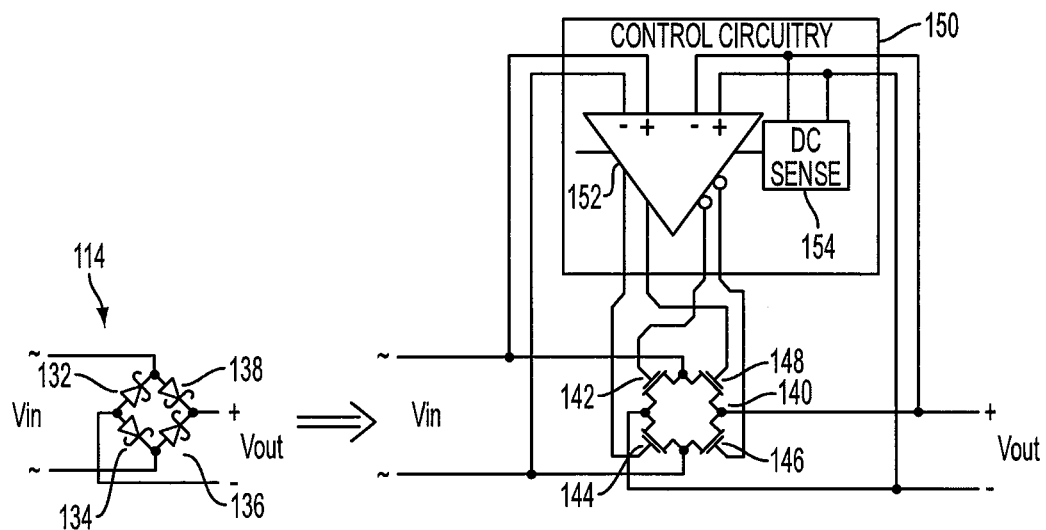
FIG. 3 is a diagram illustrating exemplary embodiments of diode and transistor bridges that may be arranged for receiving power from the auxiliary power source.
Figure 4:
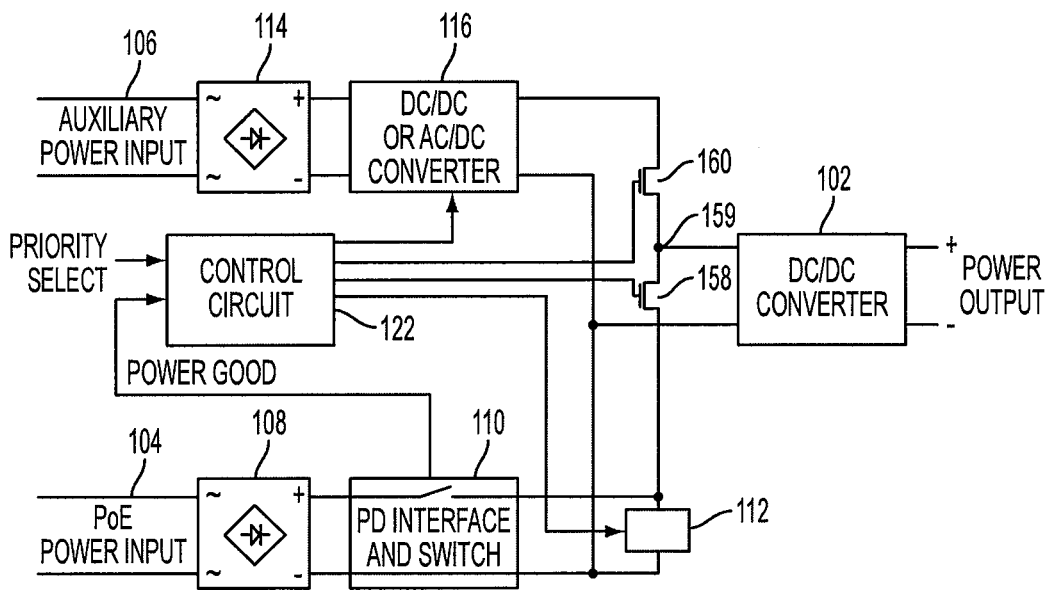
FIG. 4 is a diagram illustrating an exemplary embodiment of a power supply system having output transistor devices controlled to provide power from multiple power supply inputs to the powered device.

As illustrated in FIGS. 3 and 4, diodes in the system 100 in FIG. 2 may be replaced with transistors, such as MOSFETs, so as to improve efficiency of power delivery from the power supply inputs to the converter 102. Power loss due to the power dissipation on the diodes is particularly undesirable at the input of the auxiliary power supply channel 106 employing the diode bridge 114. For example, when the auxiliary power supply is provided from an (12±10%)V DC power source, additional voltage drops on two diodes reduces the line voltage to as low as 9.5V, reducing power delivery efficiency by 12%. In cases where power deliver efficiency is important, the diodes in the diode bridge 114 may be replaced with MOSFETs to reduce the power dissipation on the bridge to a small fraction of the power dissipation on the diode bridge.

FIG. 3 shows the diode bridge 114 with diodes 132, 134, 136 and 138 that may be replaced by a MOSFET bridge 140 with MOSFETs 142, 144, 146 and 148. The polarity of the input voltage Vin supplied to the bridge 114 or the bridge 140 from the auxiliary power source is unknown. Control circuitry 150 may be connected to the MOSFET bridge 140 to control the MOSFET bridge 140 so as to provide output voltage Vout appropriate for supplying to the input of the power converter 116. If a voltage is provided to drive the gate voltages of the MOSFETs above the high rail voltage, NMOS transistors may be selected as all MOSFETs 142-148. Alternatively, the bridge 140 may include a pair of NMOS transistors and a pair of PMOS transistors.

The control circuitry 150 may include a comparison circuit 152 that determines whether or not the voltages Vin and Vout are of the same polarity or have opposite polarities. For example, if the voltages Vin and Vout are of the same polarity, the comparison circuit 152 supplies gate control signals to gates of the MOSFETs 144 and 148 so as to place the MOSFETs 144 and 148 into an on state, while the MOSFETs 142 and 146 remains in an off state. Alternatively, if the voltages Vin and Vout have opposite polarities, the comparison circuit 152 supplies gate control signals to gates of the MOSFETs 142 and 146 so as to turn on these MOSFETs, while the MOSFETs 144 and 148 remains in the off state.

The system 100 in FIG. 2 may be arranged so as employ MOSFETs 142-148 in a MOSFET mode when the auxiliary power source is a DC voltage source, such as a 12V DC source, and to operate MOSFETs 142-148 in a diode mode when the auxiliary power source is an AC voltage source, such as 24V AC source. The control circuitry 150 may be provided with a DC sensing circuit 154 that enables the comparison circuit 152 to turn on the appropriate pair of the MOSFETs only when the DC voltage is detected at the input of the auxiliary power supply channel 106. When no DC voltage is detected, the DC sensing circuit 154 disables the comparison circuit 152 to allow the MOSFETs 142-148 to operate in a diode mode as MOSFET body diodes.

The diode bridge 108 at the input of the PoE/PoE+ power supply channel also may be replaced with a MOSFET bridge to improve efficiency of power delivery from the PoE/PoE+ power supply input to the output of the converter 102.

FIG. 4 shows the system in FIG. 2 in which the diodes 118 and 120 in FIG. 2 are replaced with MOSFETs 158 and 160 to improve power delivery efficiency. In particular, the diodes 118 and 120 cause power dissipation due to the voltage developed across a forward conducting diode. The MOSFETs 158 and 160 reduce this voltage to a value equal to the on resistance of the MOSFET multiplied by the operating current value, thus reducing the power dissipation.

Figure 5:
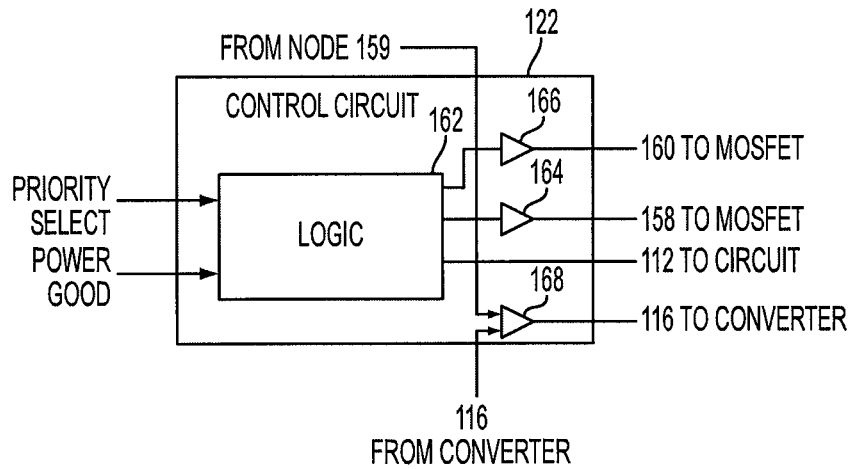
FIG. 5 is a diagram illustrating exemplary operation of a control circuit in the power supply system.

For example, the MOSFETs 158 and 160 may be controlled by the control circuit 122 that produces gate control signals supplied to gates of the MOSFETs 158 and 160 to turn on one of them and to turn off the other. As illustrated in FIG. 5, the control circuit 122 may include a logic circuit 162 that analyses the priority select signal and the power good signal to determine whether the PoE/PoE+ power supply channel 104 or the auxiliary channel 106 will provide power to the converter 102. If the logic circuit 162 determines that the PoE/PoE+ power supply channel 104 is selected to provide power to the converter 102 and is ready to supply PoE/PoE+ power, the logic circuit 162 may control a gate driver 164 to provide the gate control signal that turn on the MOSFET 158 and may control a gate driver 166 to provide a gate control signal that turns off the MOSFET 160. If the logic circuit determines that the auxiliary power supply channel 106 will provide power to the converter 102, the control circuit 122 may control the gate drivers 166 and 164 to supply the gate control signals that respectively turn on the MOSFET 160 and turn off the MOSFET 158.

The gate drivers 164 and 166 may be controlled to provide the gate control signals that turn off both of the MOSFETs 158 and 160. In this case, the MOSFETs 158 and 160 will operate in a diode mode to perform diode OR function at the node between the MOSFETs 158 and 160.

Also, the control circuit 122 may include an error amplifier 168 having a first input that senses the voltage at the node 159 between the MOSFETs 158 and 160. The second input of the error amplifier 168 may be provided with the voltage produced at the output of the power converter 116. The output signal of the error amplifier 168 is supplied to a control input of the power converter 116 to control its output voltage. This configuration enables the control circuit 122 to dynamically track and sense the voltage at the node 159 so as to set the output voltage of the power converter 116 slightly below the voltage at the node 159 when the PoE/PoE+ channel 104 provides power to the converter 102 while the auxiliary power is available at the input of the auxiliary channel 106. When the PoE/PoE+ power is removed or suddenly disrupted, switching from the PoE/PoE+ power supply of the PD to the auxiliary power supply is accelerated because the power converter 116 has to respond only to the difference between the output voltage of the converter 116 and the voltage at the node 159 produced before the PoE power removal, and to recover its output voltage in response to this difference.

Figure 6:
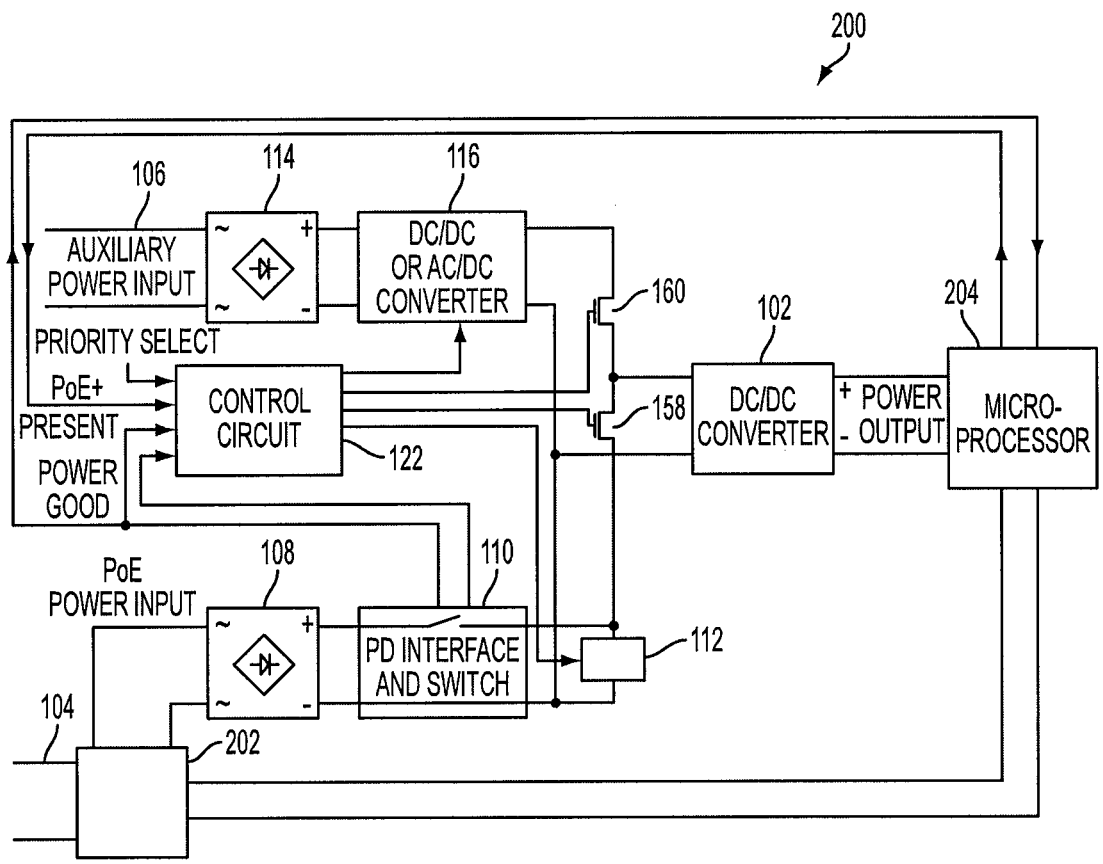
FIG. 6 is a diagram illustrating an exemplary embodiment of a power supply system configured to support PoE+ power supply and auxiliary power supply.

FIG. 6 illustrates an exemplary system 200 configured to comply with specific requirements of the IEEE 802.3at standard that specifies a PoE+ power supply procedure performed by a PSE and a PD to enable a PD to receive higher amounts of power (up to 25.5 W) from the Ethernet link. Similarly to the system 100 in FIG. 2, the system 200 includes a power supply channel 104 for providing power supply from the Ethernet cabling and an auxiliary power supply channel 106 for providing power from an auxiliary AC or DC power source such as a wall transformer. The system 200 operates in the manner similar to the operation of system 100. However, special provisions must be taken to handle PoE+ power supply prescribed by the IEEE 802.3at standard because the PD must first draw no more than 12.95 W until it recognizes the presence of PoE+ power supply that enables the PD to draw up to 25.5 W.

In addition to the power received from the Ethernet cabling, the power supply channel 104 may receive data carried over the Ethernet cabling and required to comply with the IEEE 802.3at standard. The data may be required to recognize presence of PoE+ power supply. Therefore, in addition to the components described in connection with FIG. 2, the system 200 includes components required to handle the data. In particular, a power/data separator 202 is configured at the input of the channel 104 to receive a combined power/data signal from the Ethernet cabling and to separate the data from the power. As one skilled in the art would recognize, the power/data separator 202 may be implemented using a pair of transformers. The separator 202 forwards the data received from the Ethernet cabling to a microprocessor 204, whereas the power is supplied to a input circuit such as the diode bridge circuit 108.

In accordance with the IEEE 802.3at standard, classification of PD may be performed using two forms of classification: Physical Layer classification and Data Link Layer classification. Physical Layer classification occurs before a PSE supplies power to a PD when the PSE asserts a voltage onto the PI (power interface between the PSE and the transmission medium) and the PD responds with a current representing a limited number of power classifications. With Data Link Layer classification, the PSE and PD communicate using the Data Link Layer Protocol after the data link is established. Subsequent to successful detection of PD, PSEs may perform classification using at least one of the following: 2-Event Physical Layer classification; 2-Event Physical Layer classification and Data Link Layer classification; or 1-Event Physical Layer classification and Data Link Layer classification.

During 2-Event classification, the PSE interacts with the PD interfacing and switching circuit 110 in accordance with the procedure prescribed by the IEEE 802.3at standard to classify the PD twice. In response to the 2-event classification, the PD interfacing and switching circuit 110 provides a signal to the control circuit 122 indicating the presence of PoE+ power supply.

Alternatively, PoE+ power supply may be declared based on the Data Link Layer classification. In this case, the microprocessor 204 recognizes the PoE+ power supply declaration based on the data received from the separator 202. When the microprocessor 204 detects the PoE+ power supply, it determines whether the PD interfacing and switching circuit 110 asserts the power good signal indicating that it is ready to pass PoE+ power to the PD. If the power good signal is asserted, the microprocessor 204 supplies a PoE+ present signal to the control circuit 122 indicating the presence of PoE+ power supply. In response, the control circuit 122 modifies its control signals to take into account the increased amount of power available at the input of the power supply channel 104.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for providing power to a powered device, comprising:
   a communication link power supply path responsive to a first power supply signal received from a communication link, for powering the powered device,
   an auxiliary power supply path responsive to a second power supply signal from an auxiliary power source, for powering the powered device,
   a power converter having an input responsive to the second power supply signal, and an output for producing a converter output signal, and
   a control circuit configured to control the power converter so as to provide power supply switching between the communication link power supply path and the auxiliary power supply path,
   the power converter being controlled to produce a voltage value at the output of the converter lower than a voltage value from the communication link in order to enable the communication link power supply path to power the powered device, and to produce the voltage value at the output of the converter greater than the voltage value from the communication link in order to enable the auxiliary power supply path to power the powered device.

2. The system of claim 1, wherein the communication link power supply path is configured to supply the powered device with power received from an Ethernet link in accordance with Power over Ethernet (PoE) requirements.

3. The system of claim 2, wherein the communication link power supply path is configured to receive PoE+ power from the Ethernet link provided in accordance with IEEE 802.3at standard.

4. The system of claim 3, wherein the communication link power supply path is configured to detect the PoE+ power based on 2-Event Physical Layer classification.

5. The system of claim 3, wherein the communication link power supply path is configured to detect the PoE+ power based on Data Link Layer classification.

6. The system of claim 1, wherein the control circuit is configured to provide power supply switching between the communication link power supply path and the auxiliary power supply path without disrupting power supply of the powered device.

7. The system of claim 1, wherein the power converter is controlled to produce the converter output signal at a level selected to electrically isolate the communication link power supply path from the auxiliary power supply path.

8. The system of claim 1, wherein the power converter is controlled to produce the converter output signal at a level selected to enable the communication link power supply path to receive power from the communication link when the auxiliary power supply path provides powering of the powered device.

9. The system of claim 1, wherein the communication link power supply path is configured for producing a detection signature required to detect the powered device, when the auxiliary power supply path provides powering of the powered device.

10. The system of claim 9, wherein the power converter is controlled to produce the converter output signal at a level selected to prevent the detection signature from being corrupted by the auxiliary power supply path.

11. The system of claim 1, wherein the communication link power supply path is configured for drawing an amount of current required to maintain power supply from the communication link, when the auxiliary power supply path provides powering of the powered device.

12. The system of claim 1, wherein the control circuit is configured to enable a user to select between powering the powered device from the communication link and powering the powered device from the auxiliary power source when both the communication link power supply path and the auxiliary power supply path are available for powering the powered device.

13. The system of claim 12, wherein the control circuit is configured to control the power converter so as to power the powered device in accordance with user's selection.

14. The system of claim 1, wherein a diode bridge is provided at an input of the auxiliary power supply path to receive the second power supply signal.

15. The system of claim 1, wherein a transistor bridge including first and second pairs of transistors is provided at an input of the auxiliary power supply path to receive the second power supply signal.

16. The system of claim 1, further comprising a first output diode component and a second output diode component, wherein the first output diode component is controlled to enable the communication link power supply path to power the powered device and prevent the auxiliary power supply path from powering the powered device, and the second output diode component is controlled to enable the auxiliary power supply path to power the powered device and prevent the communication link power supply path from powering the powered device.

17. The system of claim 1 further comprising a first output transistor component and a second output transistor component, wherein the first output transistor component is controlled to enable the communication link power supply path to power the powered device and prevent the auxiliary power supply path from powering the powered device, and the second output transistor component is controlled to enable the auxiliary power supply path to power the powered device and prevent the communication link power supply path from powering the powered device.

18. The system of claim 17, wherein the control circuit is configured to control the power converter in accordance with a difference between an output voltage of the power converter and a voltage at a node between the first transistor and the second transistor.

19. The system of claim 1, wherein the power converter is configured to perform power factor correction.

20. A system for providing power to a powered device, comprising
a communication link power supply path responsive to a first power supply signal received from a communication link, for powering the powered device,
an auxiliary power supply path responsive to a second power supply signal from an auxiliary power source, for powering the powered device,
a power converter having an input responsive to the second power supply signal, and an output for producing a converter output signal, and
a control circuit configured to control the power converter so as to provide power supply switching between the communication link power supply path and the auxiliary power supply path,
wherein a transistor bridge including first and second pairs of transistors is provided at an input of the auxiliary power supply path to receive the second power supply signal,
the transistor bridge is controlled to set the first pair of transistors in an on state and the second pair of transistors in an off state when a polarity of a signal at an input of the transistor bridge coincides with a polarity of a signal at an output of the transistor bridge, and
the transistor bridge is controlled to set the second pair of transistors in an on state and the first pair of transistors in an off state when a polarity of the signal at the input of the transistor bridge does not coincide with a polarity of the signal at the output of the transistor bridge.

21. A method of providing power to a powered device from a communication link power supply path responsive to a first power supply signal received from a communication link, and an auxiliary power supply path responsive to a second power supply signal from an auxiliary power source, the method including the steps of:
converting the second power supply signal to produce an output signal having a first voltage value lower than a voltage value from the communication link so as to enable the communication link power supply path to power the powered device and to prevent the auxiliary power source from powering the powered device,
converting the second power supply signal to produce the output signal having a second voltage value higher than the voltage value from the communication link so as to enable the auxiliary power supply path to power the powered device and to prevent the communication link from powering the powered device.

22. The method of claim 21, wherein the second power supply signal is converted so as to perform power factor correction.

23. The method of claim 21, wherein a detection signature required to detect the powered device is produced by the communication link power supply path when the auxiliary power supply path provides powering of the powered device.

24. The method of claim 23, wherein the output signal is produced so as to prevent the detection signature from being corrupted by the auxiliary power supply path.

25. The method of claim 21, wherein an amount of current required to maintain power supply from the communication link is drawn from the communication link power supply path, when the auxiliary power supply path provides powering of the powered device.

26. The method of claim 21, wherein a user is enabled to select between powering the powered device from the communication link and powering the powered device from the auxiliary power source when both power from the communication link and power from the auxiliary power source are available for powering the powered device.

27. The method of claim 21, wherein the communication link provides PoE+ power in accordance with IEEE 802.3at standard.

28. The system of claim 27, wherein the PoE+ power is detected based on 2-Event Physical Layer classification.

29. The system of claim 27, wherein the PoE+ power is detected based on Data Link Layer classification.

* * * * *